United States Patent [19]

Sanderson

[11] 4,079,210

[45] Mar. 14, 1978

[54] RINGING AND TESTING CONTROL CIRCUITRY FOR COMMUNICATION SYSTEMS

[75] Inventor: Richard Barton Sanderson, Lisle, Ill.

[73] Assignee: Bell Telephone Laboratories, Incorporated, Murray Hill, N.J.

[21] Appl. No.: 795,941

[22] Filed: May 11, 1977

[51] Int. Cl.² .......................................... H04M 19/02
[52] U.S. Cl. .......................... 179/18 HB; 179/84 R; 179/175.2 R
[58] Field of Search ............... 179/18 HB, 18 J, 84 R, 179/84 A, 175, 175.2 R, 175.2 B, 175.2 C, 175.23

[56] References Cited

U.S. PATENT DOCUMENTS

| | | | |
|---|---|---|---|
| 3,378,650 | 4/1968 | Goeller, Jr. ................. | 179/175.2 |
| 3,978,292 | 8/1976 | Hill et al. ................... | 179/18 HB |
| 3,978,293 | 8/1976 | Feiner ....................... | 179/18 HB |

Primary Examiner—Thomas A. Robinson
Attorney, Agent, or Firm—Frederick W. Padden

[57] ABSTRACT

An electronic program controlled switching system is disclosed having a ringing control circuit for testing called lines for foreign potential and excessive leakage before ringing the called phone. The circuit includes bridge rectifiers and transistor circuitry for checking for foreign potentials and ferrod sensors for detecting undesired leakage. An opto-isolator and relay arrangement controls the application of ringing to the called line. Active filter and latch operational amplifiers sense the application of the ringing and the answering of the rung phone. Magnetic latching relays establish successive test and ringing configurations of the ringing control circuit components under control of a signal distributor and a program controlled processor. Ferrod sensors convey ringing control circuit information to the processor via a scanner.

22 Claims, 4 Drawing Figures

ELECTRONIC SWITCHING OFFICE

| | IDLE | POWER CROSS | TEST RING | RING RING |
|---|---|---|---|---|
| | 0 | 1 | 2 | 3 |
| A OPERATED | RING TIP | TEST TIP | NU | NU |
| | 4 | 5 | 6 | 7 |
| B OPERATED | NU | NU | NU | NU |
| | 14 | 15 | 16 | 17 |
| C OPERATED | NU | NU | NU | NU |
| | 10 | 11 | 12 | 13 |
| D OPERATED | SET PBX | PBX POWER CROSS | TEST PBX | |

RINGING AND TESTING CONTROL CIRCUITRY FOR COMMUNICATION SYSTEMS

BACKGROUND OF THE INVENTION

This invention relates to circuitry for detecting ringing and trip currents as well as foreign potentials on telephone lines.

With the advent of electronic switching systems, speedy and efficient program controlled testing and ringing procedures were introduced to check for line and circuit abnormalities on each call and to ensure the proper ringing of called lines. The procedures generally commence with the testing of a called line immediately prior to ringing and for detecting troubles that would impair the ringing job. Such trouble testing typically includes checks for excessive line leakage and for foreign potentials which may be occasioned by crosses between power and telephone lines. After the tests indicate that the line is in satisfactory working order, the procedure continues with periodic 20 Hertz ringing power being connected to the called line and the actual flow of ringing current over the called loop being verified by a ringing current detector. Thereafter, when the rung telephone is answered, the telephone off-hook loop current is detected to interrupt, or trip, further ringing of that phone and to make the ringing facilities available for serving other calls.

One exemplary arrangement for performing the foregoing testing and ringing functions is disclosed in L. F. Goeller, Jr., U.S. Pat. No. 3,378,650 of Apr. 16, 1968. Although the Goeller arrangement has achieved widespread use in present day switching systems, a need yet exists for ringing facilities with reduced power requirements, smaller physical size, integrated self-checking, and more reliable operation in the presence of undesired signals such as induced longitudinal line voltages and harmonic signals.

SUMMARY OF THE INVENTION

The foregoing needs and others are fulfilled in a specific embodiment of my invention in which reduced power consumption is achieved by switching operating voltages to a ringing current and ring trip detector only during periods of actual use on calls and by utilizing fewer electromechanical relays for functional operations. Smaller physical size and more reliable operation is achieved by utilizing active filter and latch operational amplifiers for both sensing the application of ringing current to a called line and detecting the flow of trip current when the rung phone is answered. Sensitive bridge rectifier and transistor amplifiers are also provided for improved detection of foreign potentials on the tip and ring path to a called line. Switching logic is also incorporated in the ringing control circuitry for integrated self-checking operations of the ringing current sensors and ring trip circuitry during the foreign potential test and the actual application of ringing current. The structural innovations of the specific embodiment are incorporated in a ringing control circuit which forms a part of a program controlled electronic switching system disclosed in the aforementioned Goeller patent. As in Goeller, the ringing control circuit is equipped with a termination in the telephone switching network and that termination is selectively connected through the network to a called line for the testing and ringing operations in response to programmed instructions from a high speed central processor. After such connections have been established, the processor instructs a signal distributor to switch the ringing control circuit successively into a plurality of distinct states for testing initially for foreign potential on the called line and then for any undesired excessively low leakage resistance thereon before the ringing power is supplied to the line.

The ringing control circuit is equipped with a pair of conductors terminated in the switching network and for connection to a called telephone having a ringer. In accordance with my exemplary embodiment, the structure for detecting foreign potentials includes a pair of bridge rectifiers and transistor circuits individually connected to the two network conductors. Each one of the rectifiers is connectable to an individual one of the network conductors and is responsive to a foreign potential, such as an AC (Alternating Current) power cross voltage, for producing an output unidirectional voltage. The transistor circuit is responsive to the latter voltage for generating a foreign potential indicating signal. The circuit comprises a pair of transistor amplifiers each of which is connected to an individual one of the rectifiers and which is activated by the unidirectional voltage above a predetermined threshold for operating a combining transistor amplifier. The pair of amplifiers have their outputs connected to the combining amplifier via a timing means for delaying the operation of the combining amplifier until the unidirectional voltage above the predetermined threshold persists for a prescribed period. In operating, the combining amplifier generates a foreign potential indicating current for saturating a ferrod sensor.

The illustrative ringing control circuit is further equipped with a switching arrangement which is responsive to the receipt of instruction signals from the signal distributor and processor for connecting the network conductors to both a source of ringing power for actuating the telephone ringer and, advantageously, to a detector which senses the actual flow of ringing current in the loop to the called line. The switching arrangement includes an opto-isolator which is activated in response to a receipt of instruction signals for operating a ring relay for connecting the ringing power to the network conductors. The opto-isolator appropriately isolates the ringing current applied detector and ring trip detector from loading by the remainder of the ringing control circuit apparatus. A transistor circuit light-coupled to a light-emitting diode forms the opto-isolator. The circuit functions to operate the aforementioned relay for connecting ringing power via a loop resistor toward the called line. Advantageously, the resistor is used for deriving an AC signal for operating the ringing current applied detector and a separate DC (Direct Current) signal for operating a ring trip detector.

A feature of my invention is that the ringing current applied detector and ring trip detector are powered by a floating voltage power supply. The latter is activated only during each of the functional states of the ringing control circuits and supplies a plurality of different regulated voltages which are floating with respect to the customary telephone switching office voltages. Specifically, the floating power supply is activated by the office voltage being connected through relays operated by the signal distributor to switch the control circuit through its various testing and ringing states.

One of the floating voltages is connected to the loop resistor to reference the input AC and DC signals to the ringing current applied detector and the ring trip detector. In accordance with another aspect of my invention, the ringing current applied detector comprises an active filter circuit which has reduced sensitivity to 60 Hertz longitudinal currents on a called line and high sensitivity to an illustrative 20 Hertz ringing current. The active filter includes an operational amplifier having a pair of inputs one of which is connected biaswise to a second one of the floating voltages and another input which is connected via a resistor-capacitor low-pass filter and to the loop resistor for operating the operational amplifier when the derived portion of the ringing power signal is of a magnitude greater than the second one of the floating voltages. An output of the operational amplifier is connected to a resistor-capacitor network for filtering the AC ringing signal. The filtered signal, in turn, operates a latch operational amplifier for saturating a ferrod sensor to signal the processor via a scanner that ringing current has actually been applied to a called line.

Another feature of my invention is the provision of a detector which senses a DC current flow through the loop resistor in response to a called party answering the rung phone. The detector comprises an active filter circuit that is sensitive only to DC and AC signals below, for example, 5 Hertz for activating a latch circuit to effect an interruption or tripping of ringing. The active filter includes an operational amplifier with input and output resistor-capacitor filters and biasing by the second one of the floating voltages. The latch circuit similarly includes an operational amplifier with diode-resistor latch control for effecting a deactivation of the opto-isolator and the ring relay to terminate the ringing.

Relay switching logic is also integrated into the ringing control circuit for preoperating the ring trip detector and foreign potential checking transistors to saturate ferrod sensors during respective foreign potential and ringing operations. These preoperations enable the processor to scan the sensors and determine their operability and advantageously the occurrences of false ringing interruptions due, for example, to voltage surges on a rung line.

BRIEF DESCRIPTION OF THE DRAWINGS

The foregoing features and advantages, as well as others of this invention, will become more apparent from the reading of the following description with reference to the drawing in which:

FIGS. 2 and 3 show schematically an illustrative ringing control circuit; and

FIG. 4 shows a "state" diagram for the various switching states into which the ringing control circuit of FIGS. 2 and 3 is switched during the servicing of telephone calls to single party, two-party, and PBX stations.

Figure 2:
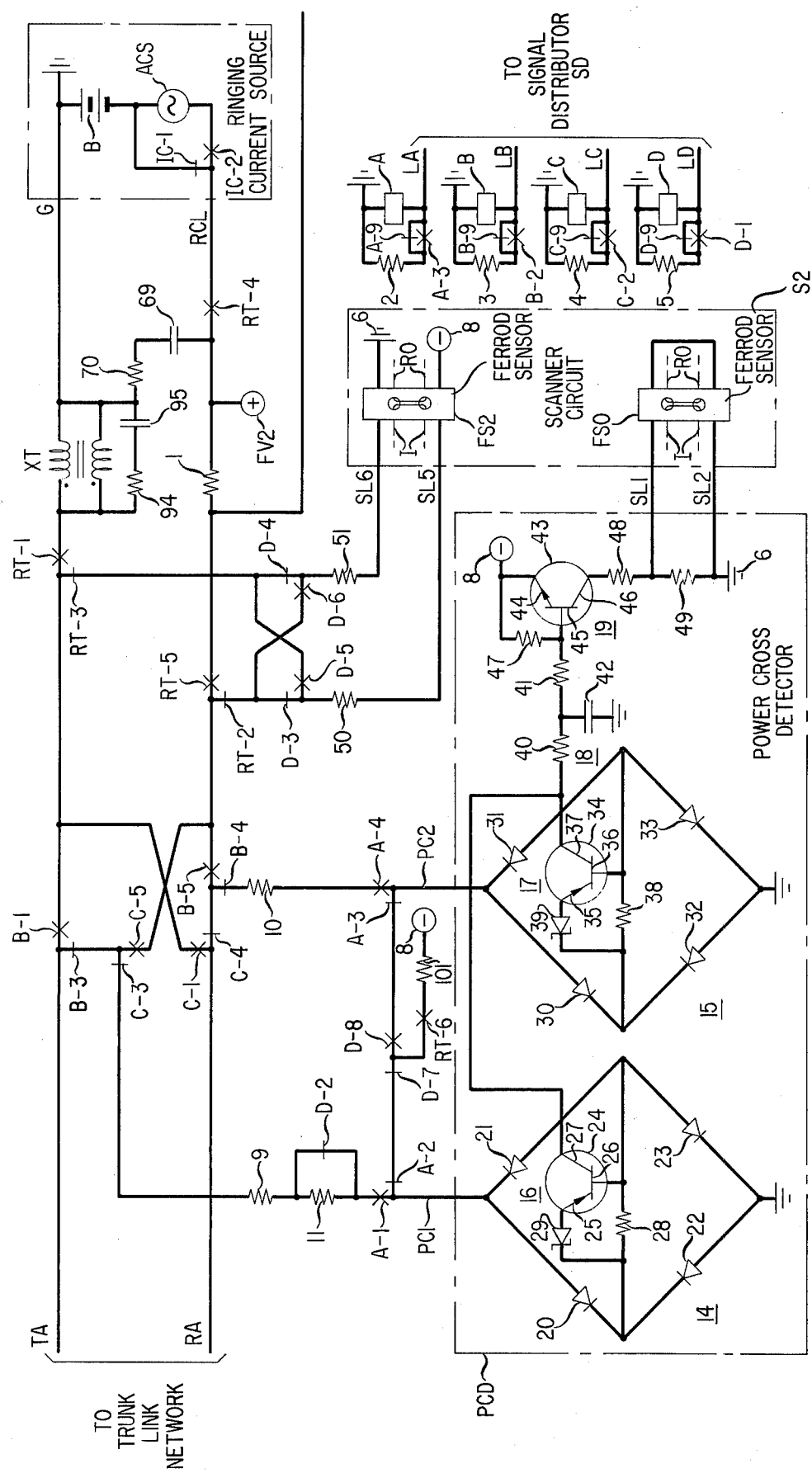

It is noted that FIGS. 2 and 3 employ a type of schematic notation for relays. This notation is referred to as "detached-contact" in which an X crossing the line represents a normally open contact of a relay and a bar crossing a line represents a normally closed contact of a relay; "normally" referring to the nonoperated, or released, state of a relay. The other relay components including its winding are represented by a rectangular symbol. The principles of this type of notation are described in an article entitled "An Improved Detached-Contact-Type of Schematic Circuit Drawing," by F. T. Meyer in the September 1955 publication of the *American Institute of Electrical Engineers Transactions, Communications and Electronics*, No. 20, Vol. 74, pages 505–513.

Each relay contact is designated in the drawing in a manner which indicates the relay of which it is a part and, as well, uniquely identifies it with respect to the other contacts of the same relay. For example, referring to contact A-1 shown in the middle left side of FIG. 2, it is noted that the A portion of the designation indicates that it is controlled by the A relay of FIG. 2 and the "−1" uniquely identifies it with respect to another contact A-2 of relay A, the latter contact also being shown at the left side of FIG. 2.

The equipment illustrative of the principles of the present invention has been designed for incorporation, by way of example, into an electronic program controlled telephone system of the type disclosed in R. W. Downing et al. U.S. Pat. No. 3,570,008 issued Mar. 3, 1971. It is particularly concerned with the ringing circuit RC depicted by the heavy-lined block in FIG. 1. The other equipment elements are neither shown nor described in detail herein, except where necessary for a complete understanding of the invention. The cited Downing et al. patent and the patent referred to therein may be consulted for a complete understanding of the construction and operation of the scanners S1 and S2, signal distributor SD and the other elements not described in detail herein. While certain of the circuit details of the line and trunk link networks LLN and TLN are set forth in the Downing et al. patent, more definite specifications of these networks are presented in the following patents: T. N. Lowry U.S. Pat. No. 3,231,679, A. Feiner U.S. Pat. No. 3,257,513, and K. S. Dunlap et al. U.S. Pat. No. 3,281,539.

GENERAL DESCRIPTION

The organization of the principal equipment units of the illustrative embodiment of my invention will now be described with reference to FIG. 1. The electronic switching office is designed to serve many types of telephone calls including intra-office calls. Such a call is initiated from a customer station, such as the station TS, and it is completed via the electronic switching office to a customer station, such as the station TP, RP or SP or a station of a private branch exchange PBX. An intra-office call is deemed to be a suitable type for explaining and obtaining a full understanding of the features of the present invention.

The stations TS, SP, TP and RP as well as the PBX are connected to the switching office over the telephone lines L1-LN and LP and are terminated in both a line scanner S1 and the line link network LLN. Scanner S1 is employed for sensing "on-hook" and "off-hook" signals representing calling requests for service on the lines L1-LN and LP.

The network LLN comprises switching facilities for establishing communication connections from the lines L1-LN and LP to the trunk link network TLN via network wire junctors J. Similarly, the network TLN includes switching facilities for establishing connections from the junctors J to digit receivers and dial tone supplies such as receiver DR and supply DTS, as well as to intra-office trunk circuits such as circuit TC. In addition, the network TLN is advantageously used for establishing connections from the junctors J to the audible ringing circuit AR and the ringing control circuit RC. The latter connections are used for supplying audible ringing tone to a calling line and ringing power to the called line, respectively. An advantage obtained from this use of the network TLN is that it establishes the talking paths, as well as the ringing paths required for signaling the calling and called customers.

Intra-office trunk circuit TC has a pair of appearances A1 and A2 terminated in the network TLN. The appearances A1 and A2 are selectively connectable during the establishment of a call to the calling and called lines respectively via the networks TLN an LLN.

Ringing circuits AR and RC each have an appearance in the system switching network which is used for supplying audible ringing tone and ringing power to the calling and called lines, respectively. These ringing circuits are not associated with trunk circuits via special ringing selection switches as in prior art arrangements. Furthermore, the ringing circuit RC is equipped with ring tripping apparatus which eliminates the need for individual trip ringing relays in each of the individual trunk circuits in the system. Thus, the ringing circuit RC is essentially a common control facility which controls the ringing of called customer stations and which advantageously eliminates costly and complex ringing control facilities in individual trunk circuits.

The ringing circuits AR and RC, as well as the trunk circuit TC, have no individual line supervisory relays for monitoring "on-hook" and "off-hook" conditions on the lines L1-LN and LP during the servicing of calls. Similarly, the digit receivers do not comprise any digit registers as have been heretofore employed in prior art circuits. Instead, the ringing circuits, trunk circuits and digit receivers are provided with a plurality of scan points, such as the points SP1-SP4 to which are applied the appropriate "on-hook," "off-hook" and digit signals. These scan points are connected to the scanner S2, which senses the applied signals for subsequent use by the central processor CP.

In accordance with the Downing et al. patent, a vast amount of the logic, control, storage, supervision and translation functions required for the operation of the ringing circuits, trunk circuits, and digit receivers, as well as the other circuits of the electronic switching office, are performed by the common control equipment comprising the central processor CP. Accordingly, a minimal amount of control circuitry is needed in the individual ringing circuits, trunk circuits and receivers and only the essential switching devices and transmission apparatus are included therein. These switching devices, in most instances, comprise magnetic latching relays (for example, the relays A, B, C and D of FIG. 2) which are connected to signal distributor SD. This distributor acts as a buffer between the high-speed central processor CP and the relatively slow-speed relays to provide for the operation of the relays whereby the circuits are switched into the different functional states required for serving intraoffice calls. Distributor SD causes the operation and the subsequent release of the latching relays upon the receipt of programmed instructions from the processor CP.

Communications between the distributor SD, scanners S1 and S2, and processor CP are by way of bus systems and multiconductor cables which provide discrete communication paths between selected ones of the circuits. These bus systems and cables are described in Downing et al. and are represented herein by the bus systems and cables BSC.

As set forth in the Downing et al. patent, the processor CP is a centralized data processing facility which is employed to implement the various telephone administrative and maintenance functions of the switching system. It is divided functionally into three units comprising a call store CS, program store PS and a central control CC. The call store CS is a temporary or erasable memory facility which employs apparatus for storing information pertaining to calls in progress. Such information includes: (1) the busy-idle status of communication paths through the line and trunk link networks LLN and TLN, (2) the digits received from a digit receiver DR, and (3) the information required for connecting the appropriate ringing circuit to the calling and called lines for ringing.

The program store PS is a semipermanent memory facility which is employed to store the less changing system information including the system programs and a variety of translation information, such as the directory number to line equipment location data. Translation facilities are also furnished in the program store PS for deriving semipermanent information for routing, charging, ringing and the like on telephone calls.

The central control CC is the primary information processing unit of the system. It is capable of executing, one at a time, many different types of basic instructions, or orders, required for controlling the line and trunk link networks, trunk circuits, digit receivers, and ringing circuits during calls. These instructions are written in the form of programs which are stored in the program store PS. The programming instructions are the vocabulary of the machine and are used to inform the switching circuits of the system how and when to perform their various functions. The central control CC requests an instruction from the program store every few milliseconds and, upon receiving it, executes or commands the appropriate circuit or circuits to carry out the appropriate functions. Accordingly, the central control CC is the hub of the system which originates all addresses and commands to other circuits and receives back all answers from those circuits. It is important to note, however, that the central control CC is capable only of executing individual instructions and that the mechanized intelligence required to supply the instructions needed for the complex telephone functions of the system resides entirely in the stored programs.

Turning now to the manner in which an intra-office call is served by the switching system, it is initially assumed that a customer at station TS initiates a call to one of the stations SP, RP, or TP. When the caller removes the telephone handset from its cradle, an "off-hook" signal is sensed by the scanner S1 as set forth in the Downing et al. patent. Subsequently, the central control CC, in executing a line scanning operation, interrogates the scanner S1 and reads out the "off-hook" condition. It then consults the busy-idle information stored in the call store CS for each line to ensure the "off-hook" condition has not been previously observed for line L1. Upon ascertaining that the line L1 was previously "on-hook", the central control CC concludes that a call origination has occurred and it updates the busy-idle information for line L1 in the store CS. The central control CC knows the scanner address of line L1 and uses it to refer to a translation area in the program store PS which provides it with all of the service information it needs concerning the line L1. Such information includes data pertaining to whether the line is an individual or a party line or whether the associated telephone transmits dial pulses or TOUCH-TONE signals.

The central control CC then selects an idle digit receiver DR and the associated dial tone supply DTS for use on the call. Next, the control CC ascertains the availability of an idle path from the line L1 through the networks LLN and TLN and a junctor J to the receiver DR by consulting the busy-idle information stored in the call store CS for all paths through the link networks. Upon finding such a path, the control CC sends orders to the networks LLN and TLN via the controller circuits to establish the appropriate switching connections. Thereafter, the scanner S1 is disconnected from the line L1 when the network LLN opens the cutoff contacts CA and thereby avoids any transmission degradations over the line L1 due to the scanner circuitry. The central control CC then requests the distributor SD to operate apparatus in the receiver DR for causing a dial tone to be sent to the calling line L1.

After the call connections to receiver DR have been established, the control CC scans the calling line every few milliseconds via the scanner S2 in a manner as set forth in Downing et al. This scanning operation is performed to check for both the early abandonment of the call and for dial or TOUCH-TONE pulses. An abandoned call is signified by a prolonged "on-hook" condition on line L1. Such a condition is sensed by the scanner S2 and read out by the processor CP as described in Downing et al. Each time the control CC scans the calling line, it compares the present scanner reading with the immediately preceding one which is recorded in the call store. Whenever a disagreement is found by the comparison and the calling telephone is found to be "on-hook" on the next scanning operation, the control CC recognizes that a digit is being transmitted and adds one to the pulse count kept in the call store CS for the call. A digit is deemed completed when the calling line or trunk is "off-hook" and no momentary "on-hook" change has been detected for a predetermined interdigital period.

When the control CC receives the first digit pulse transmitted by the station TS, it causes the dial tone transmission to that station to be interrupted as set forth in Downing et al.

After the called office code portion of the called number has been received, the control CC effects a translation of that code to obtain call routing and signaling information which is needed to complete the call to the station SP, RP, TP or PBX. In addition, the control CC obtains information from the office code translation which indicates that a predetermined number of called station digits will be received. The routing information directs the control CC to allocate an idle intra-office trunk circuit TC for use on the call. It also informs the control CC that the call is to be completed to a local customer station. Thereafter, the control CC reserves an available communication channel through the switching network TLN and LLN between the calling line and the intraoffice trunk circuit appearance A1 on network TLN. On the receipt of the last digit of the called station number, the control CC converts the dialed number of the called customer line to a program store address and then consults the program store PS to ascertain the line equipment number and the terminating class features of the called line. The control CC thereafter converts the received line equipment number to the location of the line busy-idle bit in the call store CS in a manner as set forth in Downing et al. This bit tells the control CC when the called line is idle and enables the call store CS subsequently to mark the line LN-1, LN or LP busy. In addition, the control CC signals the call store to record the information it needs during the ringing phases of a call.

As set forth in the Downing et al. patent, the processor CP next selects the path between the line L1 and an idle audible ringing circuit AR and between the line LN-1, LN or LP and an idle ringing circuit RC. The processor CP also selects, reserves and records in the call store CS a path from the calling to the called line via the line and trunk link networks, appearances A1 and A2, and intra-office circuit TC. The digit receiver DR is then released and its network path and the equipment involved in registering the called number is marked idle in the memory facilities of the processor CP. Afterwards, the control CC records in the call store the network path reserved for the talking connection. It also records the network location of the ringing and audible ringing circuits RC and AR. Before the control CC orders the establishment of the connections over the reserved paths, it also requests the ringing circuit RC to test for a foreign potential and leakage resistance on the called line to which it is connected. The processor CP subsequently sends orders via the bus BSC to the distributor SD for activating switching devices in the ringing circuits AR and RC which connect the appropriate ringing signals to the calling and called lines. The application of ringing current to the called customer line is sensed by the scanner S2 during the ringing of the called telephone, and accordingly, it cooperates with the processor CP to indicate that the call is progressing satisfactorily.

When the called customer answers, the ringing circuit RC automatically trips ringing and cooperates with the scanner S2 to notify the processor CP of the answer condition. Shortly afterwards, the processor CP cooperates with the distributor SD to deactivate the ringing circuits AR and RC for both opening the paths from these circuits to the network TLN and for returning these circuits to their idle state. The processor then proceeds to establish a talking connection through the networks LLN and TLN, appearances A1 and A2, and the trunk circuit TC. The processor effects the establishment of the call connections by supplying command signals via bus BSC to the controllers of networks LLN and TLN and to the trunk circuit TC via the signal distributor SD. The signals applied to the trunk circuit TC provide for a loop-around transmission path between the appearances A1 and A2. The call conversation may then be in progress between the calling and called parties. While the call is in progress, the trunk circuit TC is periodically scanned via the scanner S2 under the control of the processor to detect when the call is terminated.

After the caller or called party replaces the telephone handset in its cradle, a call disconnect signal may be sensed by the scanner S2 and it is subsequently read out by the processor CP during the scanning operation. The processor CP then initiates a timing interval as a safeguard against a false "on-hook" signal. When the timing has been completed and assuming that the calling line L1 receives an "on-hook" signal first, the call connections from the line L1 to the trunk circuit TC are released. Scanner S2 and processor CP then await an "on-hook" supervision signal from the called line and, upon its receipt, circuit TC is switched back to its idle state under control of the processor CP and the distributor SD.

DETAILED DESCRIPTION

Referring now to FIGS. 2 and 3, a detailed description is presented of the structure and operations of the ringing control circuit RC embodying features of the present invention. The circuit is a switching circuit which provides a communication path over the tip and ring leads TA and RA from the trunk link network TLN and another communication path over the leads RCL and G to a ringing current source RCS. These paths are selectively interconnected within ringing circuit RC through windings of transformer XT and resistor 1 under control of the magnetic latching relays A through D and the ring trip relay RT.

The windings of transformer XT are serially connected between lead G and either lead TA or RA under control of relays B and C during the ringing interval for limiting the current flow through these leads which may be caused by lightning surges. These windings are connected to the TA lead via contacts B-1 and RT-1 when ringing a single party line or the ring party on a two-party line. They are connected to lead RA via contacts C-1 and RT-1 when ringing the tip party on a two-party line.

Active ringing power is supplied toward the trunk line network TLN from the ringing current supply RCS via resistor 1 and contacts of the relays B, C and RT as hereinafter described. Relays A, B, C, and D are operated over the leads LA-LD under control of pulse signals supplied by the distributor SD and permit the ringing circuit to be switched into sixteen different switching states. All of the states are shown pictorially in FIG. 4 in accordance with principles set forth in an article entitled "The Map Method for Synthesis of Combinatorial Logic Circuits" by M. Karnaugh in the *American Institute of Electrical Engineers, Transactions*, Vol. 72, pp. 593-599 of November 1953.

As shown in FIG. 4, each of the relays A, B, C and D is assigned a weighted number 1, 2, 4 and 10, respectively, and each of the sixteen switching states is represented by a numerical designation which is the sum of the relay weighting numbers. The relays A, B, C and D are initially released to place the ringing circuit RC in its IDLE state 0 while it is not engaged in serving a call. During a call, relays A-D are selectively operated on a one-at-a-time basis to switch the ringing circuit into the next state required for serving a call. The ordered sequence in which the relays are operated is controlled by the program intelligence and is slightly different for ringing on individual coin and noncoin lines, as well as two-party and PBX telephone lines.

Each of the operating circuits for relays A, B, C and D includes a make contact A-3, B-2, C-2, or D-1 and a break contact A-9, B-9, C-9 or D-9 and a resistor 2, 3, 4 or 5, which shunts the winding of the relay when it is operated or released as set forth in Downing et al. when the distributor SD applies a momentary pulse potential to the associated one of the leads LA-LD and thereby completes a path through the relay winding to ground. Upon operating, the relay magnetically latches, or locks, its contacts operated and momentarily breaks the aforementioned shunt path around its winding to momentarily decrease the current flow over the associated one of the leads LA-Ld. Distributor SD detects this momentary current decrease and is thereby notified that a relay has been operated. An operated relay A, B, C or D is released in response to a momentary pulse potential which is the opposite polarity to that of the operating potential and its movement is detected in the same manner.

Various contacts of the relays A-D are used for selectively connecting the ferrod sensors FS0, FS1 and FS2 via scan leads SL1-SL6 and the associated control circuitry to leads TA and RA. The functions of these ferrods are described in detail hereinafter. Briefly, ferrod FS0 is used in cooperation with a transistor power cross detector PCD for the power cross, or foreign potential testing of called customer lines. It is also used for signaling the scanner S2 of the application of active ringing current on leads TA or RA and of the tripping of ringing. Ferrod FS1 is employed in conjunction with the ringing current applied detector RCA for sensing when ringing current is supplied to the called station. The ferrod FS2 is utilized for sensing excessive leakage on the called customer loop which leakage could cause the false tripping of ringing and erroneous charging information. It is also used for sensing the tripping of ringing and subsequently monitoring an off-hook on a rung line following the ring trip.

Each of the ferrods FS0, FS1 and FS2 is a sensing element which senses the presence or absence of current flow through the associated pair of leads SL1-SL6. The presence of current in these leads represents a binary "1" signal and an absence of current represents a binary "0" signal. A ferrod may be described simply as a saturatable transformer. It comprises a rod of ferrite material around which are wound a pair of control windings. Each pair of control windings of ferrods FS0 and FS1 is connected. The ferrod FS0 has one winding terminal connected to ground potential 6 and another winding terminal connected to power cross and ring detection circuitry RC and RD for detecting undesired power crosses on the communication path extending from leads TA and RA toward a called line and for sensing the flow of ringing current on that line. The FS1 ferrod windings are serially connected with a floating positive potential 7 and ringing current applied detector RCA for sensing an application of ringing current flow on leads TA and RA. Each of the control windings of ferrod FS2 is connected to a potential source such as ground 6 or negative potential 8 and to a scan lead SL5 or SL6 for selectively sensing an excessive leakage resistance and the tripping of ringing current.

In addition, each of the ferrods FS0-FS2 comprises an interrogate winding I and a read-out winding RO each of which is threaded through a pair of holes in the approximate center of the ferrod rod. When current flows through the control windings of a ferrod, the ferrite rod is saturated and its incremental permeability approaches that of air. When no current flows through the control windings, the permeability of the rod is relatively high. This high-low permeability characteristic of the rod is utilized for enabling the device to sense "0" and "1" signals and for interrogating and reading out the sensed signals. During a scanning operation, the central processor CP causes a pulse to be selectively applied to the interrogate winding I of each of the ferrods FS0, FS1 and FS2. If no current is flowing through the control winding of that ferrod, a pulse is coupled by transformer action to the read-out winding RO of the same ferrod for indicating a "0" signal. On the other hand, if current is flowing through the ferrod control windings, the ferrod is saturated and the interrogating pulse is essentially not coupled to the read-out winding RO for indicating a "1" signal.

Figure 1:
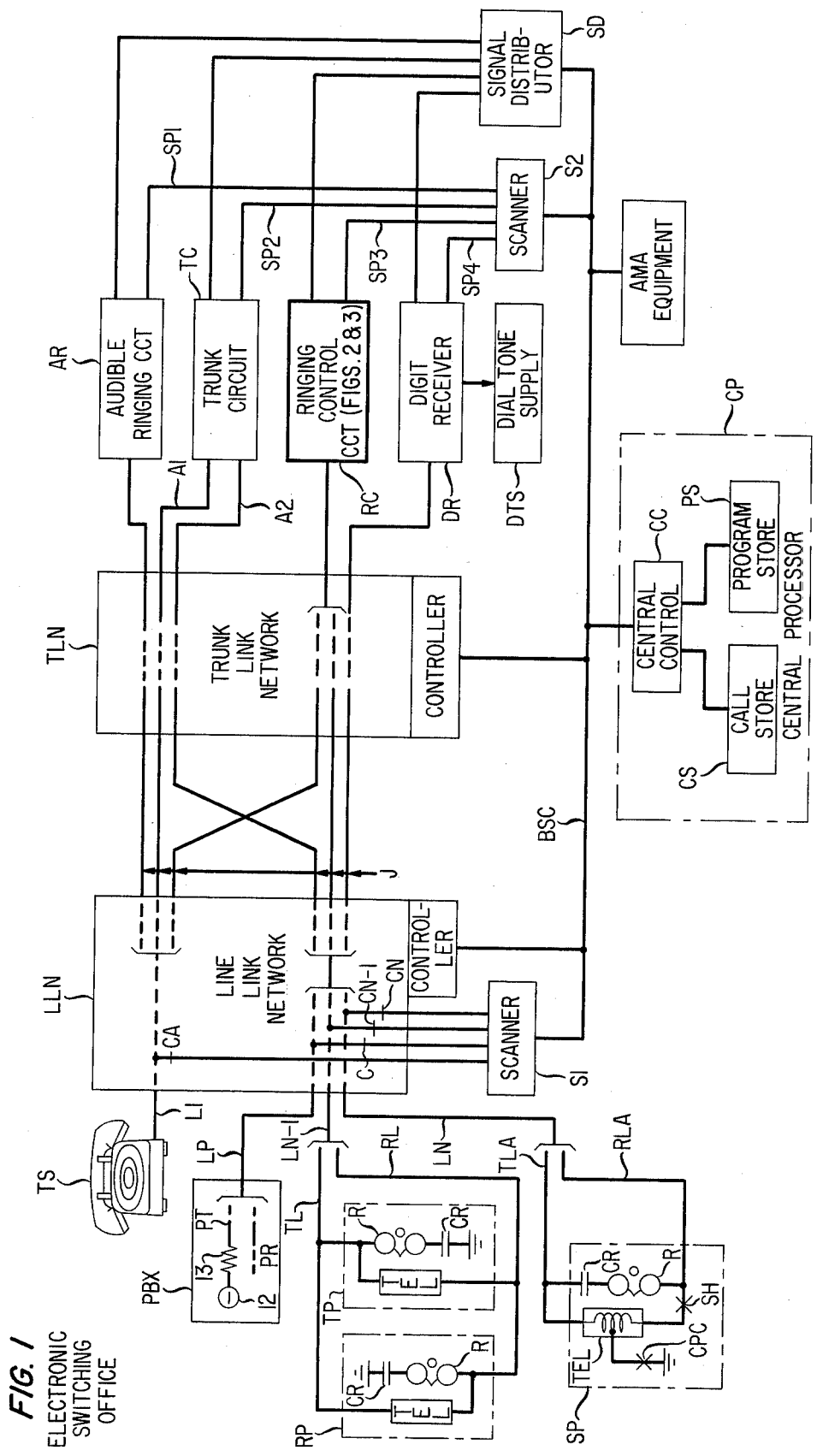
FIG. 1 is a block diagram of a program controlled telephone system employing ringing control circuitry in accordance with my invention.

The detailed operations of ringing circuit RC may be best understood by describing the ordered sequences of relay operations that occur therein for ringing the ringers R of the private and two-party customer telephones SP, TP and RP of FIG. 1, as well as those (not shown) of the PBX station telephones. For the purpose of understanding the different sequences, the ringing of a tip party telephone TP of FIG. 1 is classified as a RING TIP operation. Similarly, the ringing of a private or ring party telephone SP or RP is classified as a RING RING operation. The ringing of a PBX telephone involves a RING RING operation and is classified as a RING PBX because of different PBX test sequences through which it is switched. The following list indicates the typical sequence of states which circuit RC assumes for the aforementioned types of ringing operations. It is noted, however, that these sequences assume no trouble conditions, customer abandonment of calls, called line busy conditions and the like:

RING RING . . . 0-1-3-2-0
RING TIP . . . 0-1-5-4-0
RING PBX . . . 0-10-11-13-3-2-0

Floating Power Supply

Power for operating the ringing current applied detector RCA and ring trip detector RTD of FIG. 3 is derived from a floating power supply FPS. In the IDLE state of circuit RC, the power supply FSP and detectors RCA and RTD are off to conserve energy and are switched on only when circuit RC is in one of its operated states. Supply FPS is activated whenever any one or more of the relays A, B, and/or C is operated to close its respective contact A-8, B-9 and/or C-9 to connect the activating potential -48 volts thereto. As a consequence, supply FPS furnishes five regulated floating reference voltages, namely, FV1, FV2, FV3, FV4 and FV5, which illustratively are 0, +2, +6, +8.9 and 15 volts.

Foreign Potential Test

Ringing circuit RC rests in its IDLE state 0 when the four magnetically latching relays A-D and relay RT are all in their released state. After a call has been initiated and progressed through the electronic switching office of FIG. 1 to the point where the processor CP has ascertained that the services of ringing circuit RC are required, an idle ringing circuit RC is located by consulting the busy-idle status thereof in the called store CS of FIG. 1. When such an idle circuit has been located, it is engaged on the call and its busy-idle status is updated in store CS to reflect the engagement. Subsequently, the processor CP orders the line and trunk link networks LLN and TLN to interconnect the called customer line LN-1, LN or LP to the leads TA and RA of FIG. 2 in a manner as explained in Downing et al.

Next, the processor CP and distributor SD activate circuit RC so that a test for foreign potential is made on the called line. When the test is made on line LN-1 or LN of FIG. 1, the processor CP and distributor SD operate relay A for switching circuit RC from its IDLE state 0 to its POWER CROSS state 1. In operating, relay A completes paths whereby leads TA and RA are connected to the power cross detector PCD. One of the paths extends from lead TA, contacts B-3 and C-3, resistor 9, and contacts D-2 and A-1 to lead PC1. The other path is from lead RA via contacts C-4 and B-4, resistor 10 and contact A-4 to lead PC2. Circuit PCD then tests to determine if the called line connected through networks LLN and TLN to leads TA and RA is crossed to another line having thereon on AC or DC voltage, such as a commercial power line voltage. If it is, circuit PCD causes current to flow through the control windings of ferrod FS0 for saturating it. Thereafter, processor CP and scanner S2 scan ferrod FS0 as previously explained to detect this condition. Processor CP then recognizes that circuit RC should not be further activated to apply ringing current source since to do so might result in damage to the ringing circuit apparatus or that of the networks LLN and TLN or falsely cause the tripping of ringing as later described. When such a power cross is detected, processor CP may cause the release of the call connections to the ringing circuits RC and AR and proceed to route the calling line to a maintenance desk for service.

Before proceeding further with the description of the ringing operations for a called line LN-1 or LN, it is advantageous at this point to explain that the circuitry employed for power cross testing of a PBX line LP of FIG. 1 is essentially the same as previously explained for line LN. For line LP, the processor CP and distributor SD first switch the circuit RC from its IDLE state 0 through its SET PBX state 10 into its POWER CROSS PBX state 11 by first operating relay D and then relay A as priorly explained. In operating, relay D opens its contact D-2 to remove the low resistance shunt path around resistor 11 preparatory to the power cross test and thereby reducing the sensitivity of circuit PCD in testing the tip lead TA side of the line. When relay A is operated, circuit PCD is connected to leads TA and RA as priorly described for the power cross test.

As shown in FIG. 1, a potential 12 is normally connected to lead PT through a resistor 13 when a call is not in progress thereon. This resistance potential would cause a false power cross indication if the resistor 11 were not inserted in the path of lead TA to circuit PCD. The inclusion of resistor 11 therein enables circuit PCD to be insensitive to potential 12 on line LP and sensitive to undesirable power cross potentials.

Circuit PCD comprises a pair of full wave bridge rectifiers 14 and 15, detector transistor circuits 16 and 17 for detecting foreign potentials on the tip and ring path via leads PC1 and PC2, and further comprises a common resistor-capacitor filter network 18 with a transistor amplifier 19 for activating ferrod FS0. The bridge rectifiers 14 and 15 enable the detector circuits 16 and 17 to detect either polarity of foreign potentials extended to leads PC1 and PC2 and activate network 18 and amplifier 19 appropriately to supply a saturating current through the control windings of ferrod FS0.

For lead PC1, the full-wave rectifier 14 includes diodes 20, 21, 22 and 23 and detector 16 is provided with a PNP transistor 24 having an emitter 25, base 26 and collector 27. When sufficient current passes through the bridge diodes and a resistor 28 due to a foreign potential on lead PC1, zener diode 29 operates in its zener region for forward biasing the emitter 25-base 26 and causing collector current flow.

Similarly, lead PC2 is equipped with a full-wave rectifier 15 including diodes 30, 31, 32 and 33 and a PNP transistor 34 having an emitter 35, base 36 and collector 37. When sufficient current flows through the bridge diodes and resistor 38 due to a foreign potential on lead PC2, zener diode 39 operates in its zener region for forward biasing the emitter 35-base 36 and causing collector current flow.

Because the diode bridges are referenced to ground potential, the collector voltages of transistors 24 and 34 will be between two diode voltage drops above ground potential and two diode voltage drops plus the diode 29 or 39 zener voltage drop below ground. Illustratively, the zener voltage breakdown of diodes 29 and 39 is 6 volts. As a consequence, foreign potentials slightly in excess of 60 volts on leads TA and/or RA cause sufficient current flow to cause transistors 24 and/or 34 to become forward biased for supplying a collector current through the resistor-capacitor network 9 for activating amplifier 19 to saturate ferrod FS0.

Network 18 comprises resistors 40 and 41 and capacitor 42 for filtering the output of the detector transistor 16 and/or 17 during a detection of an AC (alternating current) power cross. Illustratively, capacitor 42 charges through resistor 40 in approximately 0.5 milliseconds and discharges through resistor 41 slowly so that amplifier 19 is activated, by way of example, for approximately 12 milliseconds. This enables an AC power cross of 60 Hertz or above to be sensed at ferrod FS0 as a continuous power cross signal. Resultingly, the processor CP effects a single scanning operation via scanner S2 to sense the power cross whereas in the prior art it was necessary to implement a periodic multiple scan at the expense of real time call processing.

Amplifier 19 comprises a transistor 43 having an emitter 44, base 45 and collector 46. Transistor 43 is back-biased in an absence of a detected foreign potential and under control of a negative potential 8 both at emitter 44 and via resistor 47 at base 45. Collector 46 is concurrently connected to ground potential 6 via resistors 48 and 49. Resistor 48 functions to limit current flow through the control windings of ferrod FS0 and resistor 49 limits the voltage rise across ferrod FS0 when current is removed.

In POWER CROSS state, a signal is applied for resetting latch LA2 to its LOW state. The reset signal is applied to the + input of latch LA2 and is derived via resistor 102, diode 103 and contacts C-6, B-6 and A-6 from negative potential FV1.

Leakage Resistance

If the called line LN-1, LN or LP associated with leads TA and RA is free from an undesired cross to a foreign potential, the processor CP and distributor SD proceed further to activate the ringing circuit RC so that it makes a leakage test of the tip and ring leads of the called line. The latter test is made to insure that the resistances between the tip and ring leads of the called line and between these leads and ground are not of such a magnitude as would cause the false and undesired detection of tripping of ringing current and thereby a possible false assessment of charges against the calling station. As is shown in the state diagram of FIG. 4, the ringing circuit RC has three states: TEST RING (3), TEST TIP(5) and TEST PBX(13) for the leakage tests. State 3 is used for performing the test of each of the pairs of tip and ring leads TL, RL and TLA, FLA of FIG. 1 on calls to the ring and single party telephones RP and SP, respectively. State 5 is used for the test of leads TL and RL on calls to the tip party telephone TP. State 13 is used for testing the leads TP and RP on calls to the PBX.

To make such a test on the line LN-1 or LN and specifically for a call to the telephone RP or SP, the processor CP and distributor SD switch the ringing circuit RC from its power cross PC state 1 to its TEST RING state 3 by activating relay B, as already explained, immediately after the power cross test has been satisfactorily completed. Upon operating, relay B latches operated. It also disconnects the power cross detector circuitry PCD from leads TA and RA at contacts B-3 and B-4. In addition, it connects the control windings of ferrod FS2 in series with the leads TA and RA of either line LN-1 on line LN and between the ring lead of that line and ground. The connections are from lead RA via contacts C-4, B-5, RT-2, and D-3, resistor 50, lead SL5, and a control winding of ferrod FS2 to potential 8; and from lead TA via contacts B-1, RT-3 and D-4, resistor 51, lead SL6, and a control winding of ferrod FS2 to ground.

When the leakage resistance is below a predetermined value between the leads TL or RL or between lead RL and ground on calls to telephone RP, or between leads TLA and RLA or between lead RLA and ground on calls to telephone SP, a prescribed current is conducted via lead RA through the left control winding of ferrod FS2 to potential 8. This current saturates ferrod FS2 so that the processor CP detects the undesired leakage condition during a scanner S2 operation. After such a detection, processor CP effects the release of call connections to ringing circuits RC and AR and the making of a record, such as a teletypewriter record, of the leakage condition and the involved call line. In addition, the processor causes the calling line to be connected to an operator position for obtaining information concerning the unavailability of the called line.

Before proceeding further to the description of the leakage test for a call to telephone TP, it is advisable to explain that either a noncoin or coin telephone may be operatively connected to the line LN of FIG. 1 for providing private line service to a customer. However, in order to illustrate an additional aspect of the leakage test apparatus, a so-called ground start coin telephone SP having a coin present contact CPC and a switchhook contakt SH is depicted in FIG. 1. A noncoin telephone is not equipped with the coin present contact and the phone is connected to line LN in essentially the same manner as phone SP. The coin phone SP is used in order to illustrate that the leakage apparatus senses an excessive leakage resistance on line LN and thereby prevents a false charge against the calling customer which charge would be assessed if ringing current was applied to such a phone when its receiver was "off-hook" and no coin was present in the coin slot. Such a receiver "off-hook" and no coin in the slot closes the switchhook contact SH but it is not sensed by scanner S1 of FIG. 1 as a call origination. The concurrence of a receiver "off-hook" and a coin in the slot is required for providing the ground start on line LN to initiate a call. However, when the receiver is "off-hook" without the coin present, a bridge resistance is connected across line LN and causes a sufficient current to flow over the tip and ring lead path for initiating a ring tripping operation as later explained and whereby a charge would be assessed against the calling party. Moreover, the ringer R of phone SP would not be rung due to the bridge resistance. Such receiver "off-hook" without a coin in the slot conditions frequently arise inadvertently in telephone systems. The existence of such a condition on a coin telephone line causes a sufficient current to flow over the tip and ring paths including leads TA and RA and through the control windings of ferrod FS2 when the ringing circuit RC is in its TEST RING state 3. This current saturates that ferrod and enables the processor CP to detect the abnormal service condition. After its detection, the call connections to circuits RC and AR are released and the calling line is connected to an operator position for service as previously described.

Turning now to the leakage test on the line LN-1 for the tip party telephone TP, it is noted that the circuit actions are essentially the same as those described with respect to the test thereon for the ring party telephone RP. The major difference is that it is necessary to reverse the TA and RA lead connections to ferrod FS2 control windings so that potential 8 is connected to lead TL instead of lead RL of FIG. 1 via lead TA and networks TLN and LLN. This reversal is effected by the processor CP and distributor SD operating relay C, as previously explained, instead of relay B and thereby switching circuit RC from its power cross PC state 1 to its TEST TIP state 5 instead of 3. The operation of relay C disconnects leads PC1 and PC2 from leads TA and RA at contacts C-3 and C-4. It also connects the ferrod FS2 control windings in series with leads TA and RA for making the leakage test between the tip and ring leads TL and RL of FIG. 1 and between lead TL and ground. The connections are from potential 8 through the left control winding of ferrod FS2, lead SL5, resistor 50, contacts D-3, RT-2, C-5 and B-3 to lead TA; and from lead RA through contacts C-1, RT-3 and D-4, resistor 51, and the right control winding of ferrod FS2 to ground. If excessively low leakage resistance is present, a current flows through at least the left control winding of ferrod FS2 to saturate the ferrod and thereby enable the processor CP to detect the leakage condition, make a trouble record and connect the calling line to an operator position for service as priorly explained.

For the leakage test of a PBX line LP, the processor CP and distributor SD switch the ringing circuit RC from its POWER CROSS PBX state 11 to its TEST PBX state 13 by operating relay B. In the latter state, the relays A, B and D are operated and relay C is released. Thus, the state 13 is essentially the same as state 3 except that relay D is operated for reversing the connections between leads TA and RA and ferrod FS2 at contacts D-5 and D-6. When relay B operates, it disconnects leads PC1 and PC2 from leads TA and RA at contacts B-3 and B-4 and connects ferrod FS2 via contacts B-1 and B-5 to the line LP of FIG. 1. The complete path is from ground through the right control winding of ferrod FS2, lead SL6, resistor 51, contacts D-6, RT-2, B-5 and C-4, lead RA and networks LLN and TLN to lead PR; and from the negative potential 12 of FIG. 1 through resistor 13, lead PT, networks LLN and TLN, lead TA, contacts B-1, RT-3, D-5, resistor 50, lead SL5 and the left control winding of ferrod FS2 to potential 8. It is noted that the negative potentials 8 and 12 thus connected to lead PT tend to cancel each other and the only current which flows in the described circuit through ferrod FS2 control windings is due to leakage resistance between the leads PT and PR and the differences in the potentials 8 and 12. If excessive, the latter leakage does not cause a call origination on the ground start line LP, but it is sufficient to effect the premature operations of ring tripping circuitry as later described and the AMA equipment of FIG. 1 for erroneously charging the caller. Hence, before circuit RC is switched into its ringing state, it is switched into its TEST PBX state so that a leakage test is made and excessive leakage does not cause false tripping and charging. In the latter state 13, if excessive low leakage is present on leads PT and PR, a sufficient current flows through the FS2 ferrod control windings over the previously traced path for saturating that ferrod and enabling the processor CP to detect the leakage condition, make a trouble record, and connect the calling line to an operator position for service as explained priorly.

In preparation for the application of ringing, the latch LA2 is switched to its HIGH state during the TEST TIP, TEST RING and TEST PBX states by connecting its + input to positive potential FV5 via either contacts B-8 and A-7, or B-7, C-8 and A-7 and resistor 100. Latch LA2 locks in its HIGH state via diodes 92 and resistor 93.

Ringing the Called Telephone

After the processor CP has ascertained that excessively low leakage resistance is not present on the called line, it activates the ringing circuit RC for applying ringing current to the called telephone. In the illustrative embodiment, the ringing source RCS comprises a battery B, a 20-cycle AC source ACS and interrupter contacts IC-1 and IC-2. The battery B is connected to the lead RCL of circuit RCS either via contact IC-1 or in series with source ACS via contact IC-2, and its power is used for operating the ring trip detector RTD following an application of ringing current to lead TA or RA and in response to a called party answer. The AC power is coupled to lead RCL for causing the activation of the ringer of the called telephone and for developing a voltage across resistor 1 for operating the ringing current applied detector RCA. The contacts IC-1 and IC-2 may form part of a power driven interrupter machine (not shown) which periodically opens and closes the contacts selectively to control the application of either the power of battery B only to lead RCL or alternatively the B battery power superimposed with the 20-cycle AC of source ACS.

When a call is to be completed to the telephone RP or SP of FIG. 1, the processor CP and distributor SD switch circuit RC from its TEST RING state 3 into its RING RING state 2 by releasing relay A and thus leaving only relay B operated. Similarly, when the call is to a telephone of the PBX of FIG. 1, the processor CP and distributor SD switch the current RC from its TEST PBX state 13 into its state 3 and then into its RING RING state 2 by successively releasing relays D and A. In state 2, relays A, C and D are released and relay B is operated.

Following the release of relay A, circuit actions occur in an opto-isolator circuit OIC of FIG. 3 for causing the operation of a ring trip relay RT. Circuit OIC comprises an LED (light emitting diode) 52 and a photodetector 53 optically coupled to and electrically isolated from diode 52. Photodetector 53 includes a Darlington connected pair of NPN transistors 54 and 55 having an effective base 56, emitter 57 and collector 58. Emitter 57 is connected to the negative voltage 8. Base 56 is optically coupled to diode 33. Collector 58 is direct coupled to a base 59 of a PNP transistor 60 via a resistor 61. An emitter 62 of transistor 60 is connected to ground potential while a bias resistor 63 is connected between the base 59 and emitter 62. A collector 64 is serially connected with an operate winding of relay RT and a resistor 65 to negative potential 8. Diode 66 is connected across the RT relay winding to limit inductive surges upon an interruption of operating current through that relay winding.

Relay RT is operated upon the aforementioned release of relay A. In releasing, relay A energizes LED 52 over a path from the floating negative potential FV1 through contact A-5, diode 52, resistor 67 and a positive potential supplied as hereinafter explained at an output of a latch amplifier LA2 in the ring trip detector RTD. A resistor 68 is connected in parallel wit diode 52 to limit the voltage across it. The energization of diode 52 causes a light emission which forward biases the base 56 — emitter 57 of the photo-Darlington transistors so that current flows through its collector 57 and resultingly forward biases the base 59 — emitter 62 of transistor 60. As a consequence, collector current flows in transistor 60 through the operate winding of relay RT for operating it. Relay RT thus remains operated until either a called party answer signal is detected as later explained or other routine call processing occurs as a result of an abandoned call.

The operation of relay RT opens its contacts RT-2 and RT-3 to disconnect ferrod FS2 from leads TA and RA. It also closes other of its contacts for completing the circuit through the ringer of the called telephone to source RCS. This circuit is from source RCS over lead RCL, contact RT-4, resistor 1, contacts RT-5, B-5 and C-4, lead RA, networks TLN and LLN, the ring lead of the called line, and the ringer R and associated capacitor CR of the called phone to ground. The circuit also includes the path from ground 1 through the transformer XT, contacts RT-1 and B-1, lead TA, and networks TLN and LLN to the tip lead of the called line.

On a call to be completed to a tip party telephone RT of FIG. 1, the processor CP and distributor SD switch the circuit RC from its TEST TIP state 4 by releasing relay A. In state 4, relay C is operated and relays A, B and D are released. State 4 differs from state 2 in that the connections between source RCS and the leads TA and RA are reversed to apply ringing power to the tip instead of the ring lead of the called line. When relay A is released, it causes the operation of relay RT in a manner as priorly described. The operation of relay RT disconnects ferrod FS2 from leads TA and RA at contacts RT-2 and RT-3. Operated relay RT also connects source RCS over lead RCL through contact RT-4, resistor 1, contacts RT-5, C-5 and B-3, lead TA, networks TLN and LLN, the tip lead, such as lead TL, of the called line, and the ringer and associated capacitor CR of the called phone to ground. At the same time, relay RT connects the ground 1 through transformer XT, contacts RT-1 and C-1, lead RA, networks TLN and LLN to the ring lead of the called line.

Upon source RCS being connected to the called line, its contact IC-2 is closed for supplying ringing current from source ACS over the already described path to actuate the ringer of the called telephone and thereby supply a ringing signal for alerting a person at the called station. Resistor 1 is included in the last-mentioned path for sensing the application of the ringing current to the called telephone and subsequently sensing the called party answer condition for effecting a tripping of that ringing current. When such current flows, it causes the operation of the ringing current applied detector RCA which, in turn, saturates ferrod FS1 to enable the processor CP to check that ringing is in progress.

The AC ringing current is interrupted at periodic intervals thereafter when contact IC-2 is opened. Upon the opening of this contact, an inductive voltage surge is present on lead RCL due to the interruption of ringing current through transformer XT. This surge voltage is limited by the capacitor 69 and resistor 70 to prevent damage to the interrupter contacts and to limit noise signal radiation to other circuits of the system.

Ringing circuit RC is arranged to inform the processor CP in cooperation with scanner S2 of the actual application of ringing power to a called line by causing ferrod FS1 to be saturated under control of a ringing current applied detector RCA of FIG. 3. The latter comprises a low-pass active filter amplifier circuit FA1 and a latch amplifier LA1. Amplifier circuit FA1 derives an input singal across resistor 1 and functions to reject input 60 Hertz longitudinal currents on the ringing loop while amplifying input 20 Hertz ringing signals and then supplying them in filter form to latch amplifier LA1. Circuit FA1 includes an operational amplifier OP1 which has − and + inputs and a single output. The passive components of the filter are resistors 71, 72, 73 and 74 and the capacitors 75 and 76. These components establish the bias, gain and frequency response of amplifier OP1. Advantageously, the − input of amplifier OP1 is referenced to the positive floating power supply voltage FV2 of supply FVS and receives only that portion of the ringing power from source RCS which is developed across resistor 1. Diode 89a is connected to floating voltage FV5 and protects the filter amplifier FA1 from overvoltage due to excessive ringing or call supervision current. The + input of amplifier OP1 is biased via resistor 74 by another positive floating voltage FV3 from source FVS.

Amplifier OP1 including capacitors 75 and 76 form a two-pole filter illustratively with a break frequency of 20 Hertz and a damping factor of 0.2. The low damping factor causes resonance illustratively at 20 Hertz. Resistor 77 and capacitor 78 form a simple one-pole filter at the output of amplifier OP1 with a break frequency illustratively at 100 Hertz. The latter components supply a filtered voltage to the + input of latch amplifier LA1 under control of amplifier OP1. The filtered voltage exceeds the floating voltage FV4 in response to an input 20 Hertz signal at the − input of amplifier OP1.

Latch amplifier LA1 functions as a voltage comparator and switch. It has a − input biased by the positive floating voltage FV4 and a + input which receives the filtered voltage from resistor 77 and capacitor 78. Latch LA1 is activated, or switched, to its HIGH state (illustratively +14 volts referenced to FV1) to its LOW state (illustratively +2 volts referenced to FV1) for saturating ferrod FS1 via diode 79, resistor 80 and ferrod control windings to potential FV5 when the filtered output of amplifier OP1 slightly exceeds the floating voltage FV4. In activating, amplifier LA1 latches to its LOW state by a forward bias conduction of diode 81 via resistor 82. The saturation of ferrod FS1 is an indication that ringing current has been supplied toward the called line. Processor CP via scanner S2 detects this condition upon a subsequent scan of ferrod FS1. Thereafter, ringing continues awaiting a called party answer.

When the call ringing is answered, the switchhook of the called telephone connects a resistance across the tip and ring leads of the called line to complete the previously traced path through resistor 1 to battery B and ground 1 of souce RCS. As a consequence, a DC current flows through resistor 1 and is sensed by the ring trip detector RTD for initiating actions which result in the termination, or tripping, of ringing and in signaling the processor CP to establish call conversation connections.

Ring trip detector RTD is equipped with a filter amplifier circuit FA2 and a latch amplifier LA2. Circuit FA2 comprises an active amplifier which in insensitive to 20 Hertz ringing power and is responsive to a DC voltage developed across resistor 1 due to a called party answer and for activating the latch amplifier LA2 to effect a ring trip as later described. The active filter includes the operational amplifier OP3 which has − and + inputs and a single output. The passive components of the filter are resistors 83, 84, 85 and 86 and the capacitors 87 and 88. These components establish the bias, gain and frequency response of amplifier OP3. Input + of amplifier OP3 is biased by the positive floating voltage FV2 and of supply FS. The − input of amplifier OP3 is referenced to the positive floating voltage FV2 and receives only that portion of the ringing power from source RCS, that is the 20 Hertz and DC voltage, which is developed across resistor 1. A diode 89 is connected to voltage FV5 and is used to protect against overvoltage at the − input. The filter, including amplifier OP3 and capacitors 87 and 88, form a two-pole filter with a break frequency illustratively of 5 Hertz and a damping factor 0.4. Resistor 90 and capacitor 91 at the output of amplifier OP3 form a single pole filter with a break frequency illustratively of 5 Hertz. By way of example, the filter amplifier is an arrangement with unity gain that is flat until 5 Hertz. The circuit then breaks downward illustratively 18 dB per octave and, at 20 Hertz, the gain is −36 dB. This allows for a rejection, or insensitivity to the 20 Hertz ringing power but not the DC called party answer voltage.

Latch amplifier LA2 functions as a comparator of the output voltage of the active filter circuit FA2 versus the floating reference voltage FV4. The comparator function is achieved by having a − input of its operational amplifier OP4 connected to the floating voltage FV4 and its + input connected to the output of amplifier OP3 via resistor 90. When the voltage at its + input exceeds the voltage FV4, amplifier OP4 is switched to its LOW state and then latches via diode 92 and resistor 93 to diminish the current flow through the LED 52 and, in turn, switching the opto-isolator transistors 54 and 55 as well as transistor 60 to their nonconduction states for releasing relay RT.

Upon releasing, relay RT trips, or terminates, the ringing of the called phone by opening the connections between source RCS and the called line at contacts RT-1, RT-4 and RT-5. Resistor 94 and capacitor 95 are effective at this time for limiting inductive surges from transformer XT resulting from the termination of ringing. At the same time, relay RT recloses its contacts RT-2 and RT-3 to reconnect ferrod FS2 to leads TA and RA for sensing the tripped ringing. The sensing occurs as a result of current flow from potential 8 and ground through the FS2 ferrod control windings via contacts of relays B or B and C, leads TA and RA, networks TLN and LLN, and the called line and telephone for saturating that ferrod. During a subsequent scanning of ferrod FS2 by scanner S2, the processor CP detects the tripped ringing and orders the distributor SD to release the relay B or C and thereby restore the circuit RC to its IDLE state 0. Processor CP then selects an appropriate trunk circuit, such as circuit TC, and paths through networks LLN and TLN for call conversation between the calling and called parties.

Integrated Self Checking

A number of self-checking features are incorporated in the ringing circuit RC to monitor the operability of its circuits and the signaling between them and the processor CP via scanner S2. Self-checking circuitry is also significantly provided for aiding in diagnosing false ring trips due to voltage surges on called customer loops.

A first such self-checking operation is performed during the POWER CROSS states 1 and 11. It involves checking the operational integrity of ferrod FS1 preparatory to its use during the application of ringing current to a called line. The check is made by saturating ferrod FS1 upon the operation of relay A and over a path from the positive potential FV5 through the FS1 ferrod control windings via leads SL3 and SL4, resistors 96 and 80, diode 97, resistor 98, and contacts C-6, B-6 and A-6 to negative potential FV1. Resistor 96 limits the voltage drop across the ferrod windings and resistors 80 and 98 are current limiters. To insure that ferrod FS1 is only saturated under control of contacts C-6, B-6 and A-6, the latching amplifier LA1 is switched to its HIGH state by applying the positive potential FV5 to its + input via resistor 99 and under control of contacts C-7 and B-7. Processor CP and scanner S2 thereafter monitor the results of the check by interrogating the saturated state of ferrod FS1 and take the appropriate trouble of routine call processing action.

The check of ferrod FS1 is continued in the TEST RING, TEST TIP and TEST PBX states 3, 4 and 13 by opening contacts B-7 or C-7 and B-6 or C-6 to unsaturate that ferrod upon the operation of either relay B or C. When relay B or C operates, the latch amplifier LA2 is forced to its reset HIGH output state preparatory to the operation of relay RT. The operated condition of relay A and thus the open condition of contact A-5 prevents the operation of relay RT in these states. The resetting signal is the positive voltage FV5 applied through contacts B-8 and A-7 or B-7, C-8 and A-7 and resistor 100 to the + input of amplifier LA2. At the same time, operated relay B or C opens its contacts B-6 or C-6 to interrupt the saturating current flow to ferrod FS1. Following these actions, the processor CP and scanner S2 make ferrod checks to ensure that ferrod FS1 is unsaturated and thus that latch amplifier LA1 is in its HIGH output state and to implement appropriate trouble or routine call processing steps.

False interruptions, or trips, of active ringing to a called line can occur due to voltage surges on that line. Such a surge can activate the ring trip detector RTD and, in turn, deactivate the opto-isolator OIA and relay RT. As priorly described, the deactivation of relay RT causes an interruption of ringing power to the called line and the connection of the tip and ring leads to the control windings of ferrod FS2 for sensing DC loop current flow. Unfortunately, when the call has not been answered, no such current flows. The processor CP and scanner S2 periodically monitor ferrod FS2 to sense if it is saturated by the DC loop current. In the absence of such current, the processor CP is confused and continues as if no ring trip had occurred. That is, circuit RC rests in its appropriate ring state and the calling party receives audible ringing tone from circuit AR of FIG. 1 until the call is ultimately abandoned. When the latter occurs, processor CP and scanner S2 check the saturated states of ferrods FS0, FS1 and FS2 to check the potential reason for the abandonment. If ferrods FS0 and FS1 are saturated, no trouble exists and the call was routinely abandoned. If ferrods FS0 is unsaturated and FS1 is saturated, the call abandonment was due to a false trip. If ferrod FS0 is saturated and FS1 is not, it indicates a circuit problem.

To make the foregoing false trip checks, ringing circuit RC activates the three transistors 24 or 34 and 19 of FIG. 2 to cause the saturation of ferrod FS0 as priorly explained. The activation is initiated by connecting the negative potential 8 through resistor 101 and contacts RT-6, D-7 and A-2 to lead PC1 during the RING RING and RING TIP states. Of course, the potential is removed upon a valid or false ring trip following a release of relay RT.

It is to be understood that the above-described arrangements are illustrative of the application of the principles of my invention. Numerous other arrangements may be devised by those skilled in the art without departing from the spirit and scope of my invention.

What is claimed is:

1. In a ringing control circuit for a communication system having a pair of conductors connectable to a telephone having a ringer, a source of ringing power for actuating said ringer, means connectable to said conductors for detecting foreign potentials thereon, and switching means responsive to a receipt of instruction signals for sequentially connecting said detecting means and said source of ringing power to said conductors, the invention wherein said detecting means comprises
bridge rectifier means connectable to each of said conductors and responsive to a foreign potential on any one of said conductors for deriving an output unidirectional voltage, and
a transistor circuit responsive to a receipt of said unidirectional voltage for generating a foreign potential indicating signal.

2. The invention as defined in claim 1 wherein
said bridge rectifier means comprises a pair of full wave rectifiers each one of which is connectable to an individual one of said conductors and is responsive to a foreign potential on said one of said conductors for producing said output unidirectional voltage, and
said transistor circuit comprises a common transistor amplifier operable for generating said foreign potential indicating signal, and
a pair of transistor amplifiers each of which is connected to an individual one of said rectifiers and is activated by said output unidirectional voltage therefrom for operating said shared transistor amplifier.

3. The invention as defined in claim 2 wherein each one of said pair of transistor amplifiers comprises threshold means for activating said one of said pair of transistor amplifiers in response to an output unidirectional voltage above a predetermined magnitude.

4. The invention as defined in claim 3 further comprising timing means interconnecting said pair of transistor amplifiers and said shared transistor amplifier for delaying the operation of said shared transistor amplifier until said output unidirectional voltage above said predetermined magnitude persists for a prescribed period and for delaying the deactivation of said combining transistor amplifier until said output unidirectional voltage below said predetermined magnitude persists for a prescribed period.

5. The invention as defined in claim 4 further comprising a ferrod sensor and wherein said shared transistor amplifier generates said foreign potential indicating signal to activate said sensor.

6. In a ringing control circuit for a communication system having a pair of conductors connectable to a telephone equipped with a ringer, a source of ringing power for actuating said ringer, means for detecting an application of said ringing power to said conductors, and a switching circuit responsive to a receipt of instruction signals for connecting to said conductors both said source for applying said ringing power thereto and said detecting means for detecting the application of said ringing power thereto, the invention wherein
said switching means comprises
a switch operable for connecting said ringing power to said conductors and
an opto-isolator circuit activatable in response to a receipt of said instruction signals for operating said switch, and
said detecting means comprises
power supply means providing a plurality of floating voltages,
an active filter circuit powered by said floating voltages and connectable to said conductors for sensing the application of said ringing power,
and circuit means activated upon said active filter circuit sensing said application of ringing power for generating an output ringing power applied signal.

7. The invention as defined in claim 6 wherein
said switch comprises an electromechanical relay having contacts and being operable for connecting said ringing power source through said contacts to said conductors, and
said opto-isolator circuit comprises a light emitting diode and a transistor arrangement light coupled to said diode and being responsive to a receipt of light emitted from said diode for operating said relay.

8. The invention as defined in claim 7 further comprising means serially connected with said relay contacts and said conductors and to a first one of said floating voltages for deriving a signal indicative of an application of said ringing power to said conductors and for operating said active filter circuit to sense said ringing power application to said conductors.

9. The invention as defined in claim 8 wherein said active filter circuit comprises
an operational amplifier having a pair of inputs one of which is connected biaswise to a second one of said floating voltages, and
a resistor-capacitor low-pass filter arrangement connected to another one of said operational amplifier inputs and to said deriving means for operating said operational amplifier in response to that portion of the applied ringing power signal which is derived by said deriving means and which is of a magnitude greater than said second one of said floating voltages.

10. The invention as defined in claim 9 wherein said ringing power comprises predetermined intervals of only direct current voltage and direct current voltage superimposed on an alternating current voltage from said ringing power source, and
said resistor-capacitor filter arrangement passes only said alternating current voltage from said deriving means to said other one of said operational amplifier inputs.

11. The invention as defined in claim 10 wherein said active filter circuit further comprises a diode reverse bias connected to a third one of said floating voltages and to said other one of said operational amplifier inputs for providing overvoltage protection for said operational amplifier.

12. The invention as defined in claim 11 wherein
said active filter circuit further comprises a resistor-capacitor network for filtering the ringing power signal at the output of said operational amplifier, and
said circuit means comprises an operational amplifier responsive to the filtered output signal from said resistor-capacitor network for generating said output ringing power applied signal.

13. The invention as defined in claim 12 wherein
said operational amplifier of said circuit means comprises an output and a pair of inputs a first one of which is connected to a fourth one of said floating voltages and the second one of which is connected to said resistor-capacitor network, and
said switch circuit further comprises a resistor and diode connected between said last-mentioned output and input and is responsive to an operation of said last-mentioned amplifier for latching it operated.

14. The invention as defined in claim 13 further comprising
a ferrod sensor,
and wherein said output ringing power applied signal from said operational amplifier of said switch circuit activates said sensor.

15. The invention as defined in claim 6 further comprising a latch operational amplifier operable to a first state for activating said opto-isolator circuit, and
means responsive to a receipt of said instruction signals for operating said operational amplifier to said first state.

16. The invention as defined in claim 15 further comprising
ring trip detector means connected to one of said conductors and responsive to a direct current flow therethrough for activating said latch operational amplifier to a second state and thereby deactivating said optoisolator circuit and said switch to effect a removal of ringing power from said conductors.

17. The invention as defined in claim 16 wherein said ring trip detector means comprises an active filter circuit including
a filter operational amplifier having a pair of inputs a first one of said inputs connected to said one of said conductors and a first one of said floating voltages for sensing direct current flow therethrough and a second one of which is connected biaswise to a second one of said floating voltages,
and a resistor-capacitor filter connected to said first one of said filter operational amplifier inputs for applying a direct current signal thereto in response to a called party answer signal on said conductors.

18. The invention as defined in claim 17 wherein said filter operational amplifier further has an output and said active filter circuit further includes a resistor capacitor network responsive to a receipt of a called party answer control signal at said operational amplifier output for deactivating said latch operational amplifier to said second state.

19. In a ringing control circuit for a communication system having a pair of conductors connectable to a telephone equipped with a ringer, a source of ringing power for actuating said ringer, a switching circuit responsive to a receipt of instruction signals for connecting said source to said conductors for applying said ringing power thereto, and means for detecting a called party answer signal on said conductors to effect a tripping of ringing, the invention wherein
said switching circuit comprises means activatable for connecting said ringing power to said conductors,
said detecting means comprises
power supply means providing a plurality of floating voltages,
a latch means powered by said floating voltages and switched to a first state by said switching circuit for activating said connecting means, and
an active filter circuit responsive to a receipt of a called party answer signal on said conductors for switching said latch means to a second state to effect a deactivation of said connecting means and a tripping of ringing power to said conductors.

20. The invention as defined in claim 19 wherein
said latch means comprises a latch operational amplifier having an output and a pair of inputs a first one of which is biaswise connected to one of said floating voltages and a second one of which is responsive to a control signal from said switching circuit for switching said output to a first state,
said switching circuit comprises an electromechanical switch having contacts and being operable for connecting said ringing power source through said contacts to said conductors, and
an otpo-isolator circuit comprising
a diode energized by said switching of said operational amplifier output to said first state for emmitting light, and
a transistor arrangement responsive to a receipt of light emitted from said diode for operating said electromechanical switch.

21. The invention as defined in claim 20 wherein said active filter circuit comprises an operational amplifier responsive to a direct current flow on said conductors upon a called party answer signal for switching said latch operational amplifier output of a second state and deenergize said light emitting diode for controlling said transistor arrangement to effect a release of said electromechanical switch and an interruption of ringing power on said conductors.

22. In a telephone system having telephone lines, a ringing and test control circuit connectable to any of said lines, and control means responsive to a receipt of a call for connecting said control circuit to a called one of said lines, said control circuit comprising:
means connectable to the called line for detecting foreign potentials thereon and including
bridge rectifier means connectable to said called line and responsive to a foreign potential thereon for producing an output unidirectional voltage,
a first ferrod sensor and
a transistor circuit responsive to said unidirectional voltage for generating a foreign potential indicating signal to saturate said sensor;
means including another ferrod sensor connectable to said called line for sensing an electrical leakage condition thereon;
means for controlling the connection of ringing power to said called line including
a diode energizable for emitting light, an electromechanical switch operable for connecting ringing power in a switching path to said called line, a transistor arrangement responsive to a receipt of light emitted from said diode for operating said electromechanical switch, power supply means providing a plurality of floating voltages and a first latch operational amplifier powered by said floating voltages and switchable to a first state for controlling an energizing of said light emitting diode;

means included in said switching path and biased to one of said floating voltages for deriving a ringing power applied signal and a direct current called party answer signal;

means powered by said floating voltages and connected to said deriving means for detecting an application of ringing power to said called line and including an active filter circuit including a filter operational amplifier having an output and a pair of inputs a first one of which is biaswise connected to a second one of said floating voltages, a resistor-capacitor low-pass filter arrangement connected to a second one of said inputs and to said deriving means for operating said filter operational amplifier in response to that portion of the applied ringing power signal which is derived by said deriving means and which is of a magnitude greater than said second one of said floating voltages, a diode reverse bias connected to a third one of said floating voltages and to said second one of said inputs for providing overvoltage protection for said operational amplifier, a resistor-capacitor filter network connected to a fourth one of said floating voltages and for filtering the ringing power signal at the output of said filter operational amplifier, a second ferrod sensor and a second latch operational amplifier having an output connected to said second ferrod sensor and a pair of inputs one of which is bias connected to a fifth one of said floating voltages and the other of which is connected to said filter network for saturating said second ferrod sensor in response to a ringing power output signal from said filter network of a magnitude greater than said fourth one of said floating voltages; and a ring trip detector powered by said floating voltages and connected to said deriving means for detecting a direct current called party answer signal and including another filter operational amplifier having an output and a pair of inputs a first one of which is biaswise connected to said second one of said floating voltages, another resistor-capacitor low pass filter connected to a second one of said other filter amplifier inputs and to said deriving means for operating said other filter operational amplifier in response to that portion of the direct current called party answer signal which is derived by said deriving means and which is greater than said second one of said floating voltages, another diode reverse bias connected to said third one of said floating voltages and to said second one of said other filter operational amplifier inputs for providing overvoltage protection for said other filter operational amplifier, and another resistor-capacitor filter network connected to said fourth one of said floating voltages and for filtering the control signal at the output of said other filter operational amplifier and switching said first latch operational amplifier to a second state to deenergize said light emitting diode and release said transistor arrangement and electromechanical switch to interrupt the application of said ringing power to said called line.

* * * * *

UNITED STATES PATENT AND TRADEMARK OFFICE
CERTIFICATE OF CORRECTION

PATENT NO. : 4,079,210
DATED : March 14, 1978
INVENTOR(S) : Richard B. Sanderson It is certified that error appears in the above-identified patent and that said Letters Patent are hereby corrected as shown below:

Column 9, line 64, "LA-Ld" should read --LA-LD--.
Column 14, line 8, "on" should read --or--; line 39, "contack" should read --contact--. Column 17, line 31, "RT" should read --TP--. Column 18, line 11, "singal" should read --signal--; line 63, "souce" should read --source--.
Column 19, line 15 "and" should be deleted. Column 20, line 29, "of" should be --or--. Column 24, line 33, "otpo" should be --opto--.

*Signed and Sealed this*

*Twenty-first* Day of *November 1978*

[SEAL]

Attest:

RUTH C. MASON
*Attesting Officer*

DONALD W. BANNER
*Commissioner of Patents and Trademarks*